United States Patent [19]
Bond et al.

[11] Patent Number: 6,103,129
[45] Date of Patent: Aug. 15, 2000

[54] METHOD FOR THE CRITICAL WATER OXIDATION OF ORGANIC COMPOUNDS

[75] Inventors: Luke David Bond, Etobicoke; Charles Chesley Mills, Mississauga; Philip Whiting, Milton; Anthony Hassan Mehta, Oakville, all of Canada

[73] Assignee: 3500764 Canada Inc., Vancouver, Canada

[21] Appl. No.: 08/181,695

[22] Filed: Jan. 14, 1994

[51] Int. Cl.$^7$ ..................................................... C02F 1/72
[52] U.S. Cl. ........................... 210/721; 210/761; 210/808
[58] Field of Search ................................... 210/696, 721, 210/758, 761, 762, 766, 808, 908, 909

[56] References Cited

U.S. PATENT DOCUMENTS

| | | | |
|---|---|---|---|
| 2,665,249 | 1/1954 | Zimmermann | 210/761 |
| 2,944,396 | 7/1960 | Barton et al. | 60/39.05 |
| 4,292,953 | 10/1981 | Dickinson | 126/263 |
| 4,338,199 | 7/1982 | Modell | 210/721 |
| 4,543,190 | 9/1985 | Modell | 210/721 |
| 4,822,497 | 4/1989 | Hong et al. | 210/721 |
| 5,075,017 | 12/1991 | Hossain et al. | 210/761 |
| 5,100,560 | 3/1992 | Huang | 210/721 |
| 5,106,513 | 4/1992 | Hong | 210/761 |
| 5,200,093 | 4/1993 | Barner et al. | 210/761 |
| 5,232,604 | 8/1993 | Swallow et al. | 210/759 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/908 |

FOREIGN PATENT DOCUMENTS

| | | |
|---|---|---|
| 0535320A1 | 4/1993 | European Pat. Off. . |
| WO81/03169 | 11/1981 | WIPO . |
| WO91/11394 | 8/1991 | WIPO . |

OTHER PUBLICATIONS

Armellini et al., Experimental Methods For Studying Salt Nucleation & Growth From Supercritical Water, CA116:182446, *J. Supercritical Fluids*, 1991.

*Primary Examiner*—Peter A. Hruskoci
*Attorney, Agent, or Firm*—Hoffmann & Baron, LLP

[57] ABSTRACT

A method for oxidizing organic material in an aqueous stream containing one or more inorganic salts, inorganic salt precursors or mixtures thereof comprises oxidizing the organic material in a reactor at a temperature at least equal to the critical temperature of the aqueous stream so as to form a single homogeneous fluid phase and at a pressure sufficiently high to solubilize the inorganic salts in the single homogeneous phase.

27 Claims, 2 Drawing Sheets

METHOD FOR THE CRITICAL WATER OXIDATION OF ORGANIC COMPOUNDS

FIELD OF THE INVENTION

This invention relates to the oxidation of organic compounds under critical conditions for water. In particular, the invention relates to the oxidation of organic compounds, water and oxygen under critical conditions and in the presence of inorganic compounds.

BACKGROUND OF THE INVENTION

Organic compounds can be oxidized in many ways including simple combustion.

One well know method for dealing with organic compounds in a waste water stream is known as Wet Air Oxidation (WAO) or the Zimmerman process (U.S. Pat. No. 2,665,249). According to this process, an organic material and an oxidizing agent, frequently air or pure oxygen, are heated in a pressurized reactor so that the reaction temperature remains below the critical temperature of water (about 374° C.) and the pressure is in the range of about 1500 to 2500 psia. At these temperatures and pressures both a liquid and a gas phase are present. Residence times of 0.5 to 1.0 hours result in oxidation of 70% to 95% of the organic compounds in the waste stream.

If more compete oxidation is desired because of the nature of the organic compounds (toxic waste) or for power generation purposes the oxidation may be carried out at critical conditions, typically at a temperature greater than 374° C. and a pressure greater than 3200 psia, Water at sub-critical temperatures is a poor solvent for non-polar materials (including many organic materials) and a good solvent for polar materials (including many inorganic materials). However, at and above the critical temperature of water many organic compounds become readily soluble in water and many inorganic compounds become insoluble. For example, the solubility of salts in critical water varies from about 1 ppb to about 100 ppm at temperatures from about 450° C. to 500° C. (U.S. Pat. No. 4,338,199 (Modell), column 3, lines 37–41. Oxygen also becomes very soluble in water at temperatures above the critical temperature and the result is that the oxidation of organic compounds takes place very quickly (in seconds). However, the insolubility of inorganic compounds results in a serious scaling problem, which is the problem to which this patent is directed.

U.S. Pat. No. 2,944,396 to Barton and Zimmerman et al. is the first description of the use of critical water oxidation for the oxidation of organic compounds. It describes an improvement to the wet air oxidation process of Zimmerman wherein a second oxidation stage is added. The effluent vapours from the wet air oxidation process are oxidized in a second reactor under critical conditions—842 to 1034° F. (column 5, lines 40–53). The result is substantially complete combustion of all organics (column 5, line 60).

More recently, critical water oxidation processes have been disclosed which directly treat the feed material without a prior wet air oxidation step. U.S. Pat. No. 4,292,953 to Dickinson discloses the critical oxidation of a carboniferous fuel to produce thermal, mechanical or electrical energy. Dickinson notes that if the salt concentration is too high, it can result in scaling of the reactor or scaling or plugging in down stream heat exchange equipment (column 6, lines 33–47).

Modell and U.S. Pat. No. 4,543,190 (Modell No. 2) disclose the use of critical water oxidation to produce useful energy and as a means of desalinating sea water and brine. The organic material may be a waste and/or toxic material or other organic material which is useful as a fuel. The high temperature oxidation produces high pressure steam which may be used for heating purposes. In an alternate embodiment, the water which is fed to the critical oxidizer may be sea water or brine and accordingly contains sodium chloride. According to the disclosure of these patents, the salt precipitates out of the single fluid phase immediately after the oxidation reaction occurs, as in conventional precipitating equipment, thus enabling desalinating of the water in a rapid and continuous process (Modell, column 2, lines 58–63). The patents note that the inorganic material may tend to build upon the walls of conventional apparatus causing hot spots with subsequent destruction of the walls, Accordingly, when the temperature in the oxidizer exceeds 450° C., the disclosure states that the inner wall of the reactor may be coated with a corrosion resistant alloy such as Hastelloy C or, if the reactor has a large diameter, the inner wall may be lined with firebrick (Modell, column 8, lines 14–34).

The scaling problem resulting from the insolubility of inorganic compounds at critical conditions has been a major impediment to the commercialization of critical water oxidation. The process is still not in commercial use.

Different approaches have been developed to handle the scaling problem. U.S. Pat. No. 4,822,497 (Hong et al.) discloses a method of conducting critical water oxidation wherein the reactor has a critical temperature zone in the upper region of the reactor and a lower temperature zone in the lower region of the reactor which has a liquid phase. The critical oxidation occurs in the upper region. Precipitates and other solids from the oxidized critical temperature zone are transferred to the lower temperature zone so as to produce a solution or slurry. The solution or slurry is then removed from the reactor. U.S. Pat. No. 5,100,560 (luang) discloses an alternate method for dealing with the scaling problem in the reactor. According to this disclosure, the reactor once again has a critical temperature zone and a lower temperature zone. At least a portion of the inner wall of the pressure vessel bounding the critical temperature zone is scraped so as to dislodge at least a substantial portion of any solids which may be deposited thereon.

Accordingly, while critical water oxidation could be very useful in various areas of industry, no solution has yet been developed to the scaling problem which arises from the insolubility of inorganic materials in the critical region. Barton et al discloses a process wherein no inorganic materials are present. Hong et al. discloses operating a reactor to have both a critical zone and a subcritical zone. The maintenance of both zones in a single reactor is technically difficult and Hong et al does not contain any example to show that both zones could be maintained in an operating reactor. Huang discloses scraping the inner surface of the critical zone of the reactor of Hong et al to prevent scale build-up. However, Huang discloses that scale build-up does occur and the mechanical action disclosed in Huang would be difficult to operate in practice and would result in a decreased lifetime of the reactor.

SUMMARY OF THE INVENTION

In accordance with the present invention, a method for oxidizing organic material in an aqueous stream containing one or more inorganic salts, inorganic salt precursors or mixtures thereof is provided. According to this method, the organic material is oxidized in a reactor at a temperature at least equal to the critical temperature of the aqueous stream so as to form a single homogeneous fluid phase and at a pressure sufficiently high to solubilize the inorganic salts in the single homogeneous phase. Preferably, the reactor may be maintained at a pressure from about 4,500 to about 25,000 psi, preferably from about 7,000 to about 13,000 psi, more preferably from about 8,000 to about 13,000 psi, and most preferably about 10,000 psi.

In accordance with an alternate embodiment of this invention, a method is provided for critically oxidizing organic material in an aqueous stream containing one or more inorganic salts, inorganic salt precursors or mixtures thereof comprising:

(a) raising the aqueous stream to a pressure sufficiently high to solubilize the inorganic salts once the stream is raised to a temperature at least equal to the critical temperature of the aqueous stream so as to form a single homogeneous fluid phase;

(b) introducing an oxidant to said aqueous stream to form a mixed stream of oxidant and said aqueous stream; and, (c) raising the temperature of the aqueous stream to a temperature at least equal to the critical temperature of the aqueous stream to form a single homogeneous fluid phase in which the oxidation of the organic material occurs whereby a stream of oxidized organic material is formed.

It is to be appreciated that, at critical conditions, the inorganic solids can become "sticky" and readily adhere to the surfaces of the reactor and other process equipment. Accordingly, as recognized by Huang, even having a liquid zone in the reactor is not sufficient to ensure that the inorganic material does not adhere to the reactor wall.

It has been discovered that by operating at elevated pressures under critical conditions inorganic salts become soluble thereby avoiding, or substantially reducing, the scaling problem which has been a major obstacle to the commercial application of critical water oxidation.

It is thought that the inorganic solubilize as a charged neutral inorganic species rather than as charge species, For example, as NaCl molecules rather than as $Na^+$ $Cl^-$. Inorganics may also solubilize as essentially charge neutral clusters of inorganic species. However, for the purposes of this invention, a detailed understanding of the mechanism or process by which solubilization occurs is unnecessary.

At the same time, the critical oxidation process is relatively unaffected by the high pressures and the oxidation reactions proceed rapidly and substantially to completion.

The organic material which may be utilized according to the process of the instant invention may be any of those which have been recognized in the field as being useful as a feed material to a critical water oxidation reactor. Accordingly, the organic material may be a waste, such as pulp and paper effluent, a toxic waste such as polychlorinated biphenyls or in fact a carbonaceous fuel such as coal or peat. The organic material may be obtained from a variety of sources including effluent from industry including the forest industry, petrochemical industry, etc.

The organic materials way be present in the aqueous stream in a wide range of concentrations. However, preferred concentrations are from about 2 to 20%.

At lower concentrations, the reaction may not be economic because of the need for additional heat to maintain the critical reaction conditions. However, for the destruction of specific organics, such as toxic substances, additional costs may be justified because of the need to deal with the substances to meet regulatory requirements.

At higher concentrations, too much heat may be produced making the reaction difficult to control.

The organic material may be mixed with an oxidant prior to entry into the reactor. Alternately, the organic material and the oxidant may be separately introduced into the reactor. The oxidant may be any material which will provide sufficient oxygen for the oxidation reaction. The oxidant may be compressed air, liquid oxygen, or compressed oxygen. At least, a stoichiometric amount of oxidant should be provided to ensure complete reaction ot the organics. It there is less than a stoichiometric amount, the oxidation reaction will not proceed to completion although in some circumstances this may be acceptable.

Preferably an excess of 10–20% of the oxidant is present to ensure complete reaction of the organics.

Waste streams may contain various inorganic materials including inorganic salts such as sodium chloride, sodium sulphate, calcium carbonate, etc. In addition, effluent streams may contain inorganic materials which, under critical oxidation conditions, will produce inorganic salts or other compounds which will adhere to or otherwise foul the walls of the reactor. As used herein, these inorganic materials are referred to as "inorganic salt precursors". If these materials are present in the aqueous feed stream to the reactor, then inorganic salts are formed in the reactor as the critical oxidation of the organic material progresses. Examples of such inorganic salt precursors include chloroorganics such as chloroform, polychlorinated biphenyls and other compounds such as ligno sulphonates. By operating the reactor at the elevated pressures as disclosed herein, the inorganic salts, whether present in the feed stream or produced during the oxidation reaction, tend to remain in solution thus preventing or at least reducing the fouling of the surfaces of the reactor and other downstream processing equipment.

BRIEF DESCRIPTION OF THE DRAWINGS

The substance and advantages of the instant invention will now be more fully and completely discussed in connection with the description of the following drawings in which.

DESCRIPTION OF THE PREFERRED EMBODIMENT

Figure 1:
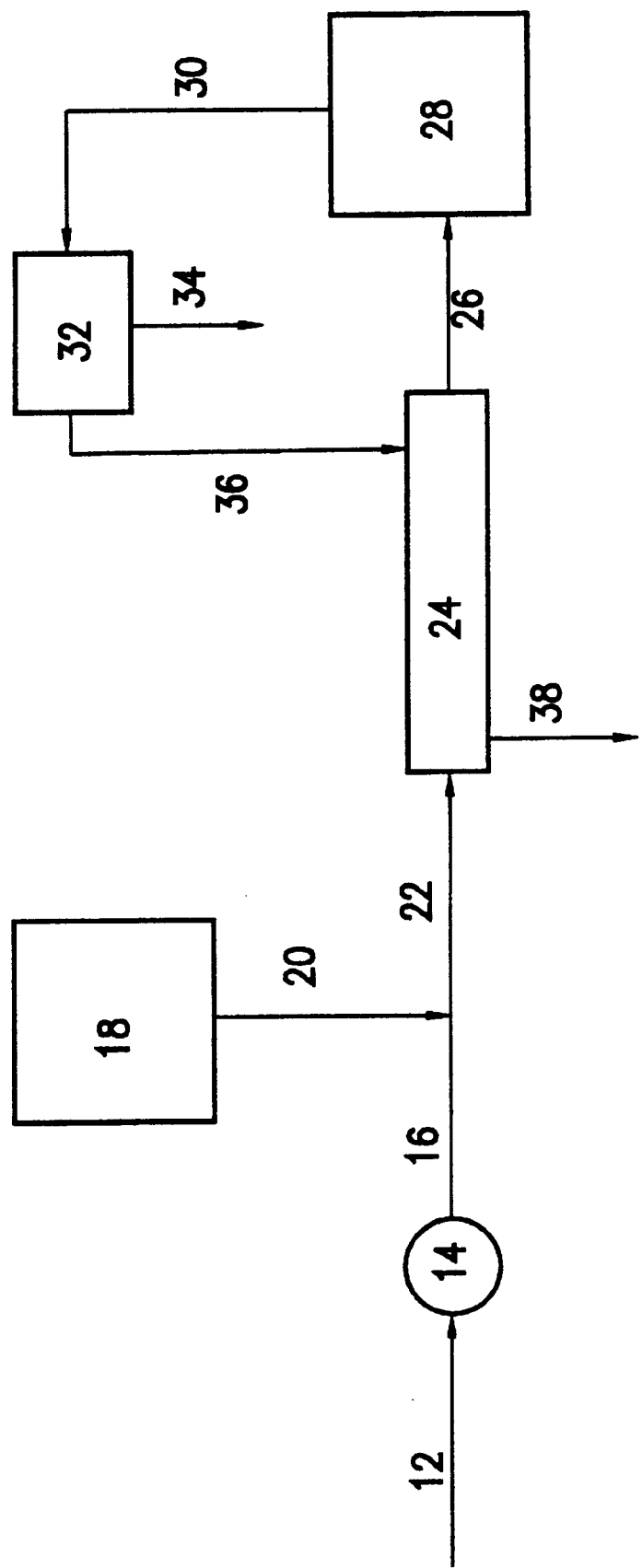
FIG. 1 is schematic of a process according to the instant invention.

A waste stream to be treated according to the instant invention is generally designated by reference numeral 12 in FIG. 1. The stream contains organic material and one or more inorganic salts. stream 12 may contain up to about 15% inorganic salts such as $CaSO_4$, NaCl, $Na_2(SO_3)$ and $Na_2(SO_4)$.

Waste stream 12 is raised to an elevated pressure by pump means 14. Pump means 14 may be a high pressure piston, a diaphragm pump or any other device known in the art which may be used to raise the pressure of a liquid stream to an elevated pressure.

Waste stream 12 is preferably raised to the pressure at which the oxidation reaction occurs. The pressure may be raised from about 4,500 to about 25,000 psi, preferably from about 7,000 to about 13,000 psi, more preferably from about 8,000 to about 13,000 psi, and most preferably from about 9,000 to about 10,000 psi.

The pressurized waste stream, generally referred to by reference numeral 16, is then mixed with an oxidant. The oxidant may be stored in storage vessel 18 and fed to pressurized waste stream 16 via stream 20. The oxidant is preferably at a pressure at least slightly higher that the pressure of the pressurized waste stream 16.

The oxidant may be any of those which are known in the art of oxidation including compressed air, liquid oxygen and compressed oxygen.

Pressurized waste stream 16 and oxidant stream 20 are mixed to produce combined liquid/oxygen stream 22. Liquid/oxidant stream 22 is fed into heat exchanger means 24. In an alternate embodiment, waste stream 16 and oxidant stream 20 may be mixed together at the point of entry to heat exchanger means 24. The mixture is passed to heat exchanger means 24 to commence increasing the temperature of the liquid/oxidant stream and accordingly to commence the oxidative reaction. Accordingly, various types of heat exchanger means may be utilized to achieve this function such as a counter current heat exchanger. Preferably, the temperature of the liquid/oxidant mixture, during its passage through heat exchanger 24, is raised to a temperature below the critical temperature of liquid/oxygen stream 22 and, preferably, to about 300° C. At such temperatures, from about 10 to about 50 per cent of the organic material in stream 22 may be oxidized to produce carbon dioxide and water.

Preferably, the liquid/oxidant stream is raised to the elevated temperature by utilizing the oxidised stream which is produced by the critical oxidation of the waste stream. Accordingly, this stream may be passed through heat exchanger means 24, such as in a counter current fashion, to heat the incoming liquid/oxidant mixture. Once external means are used to commence raising the temperature of the liquid/oxidant stream, the oxidation of the organic material in this stream will produce heat that will further increase the temperature of this stream. Optionally, the liquid/oxidant stream may be fed, without this preheating step, to reactor means 28 as described below.

Heated liquid/oxidant stream 26 exits heat exchanger means 24 and is fed to reactor means 28 wherein the critical oxidation commences. Reactor means 28 may be of various types including a reactor vessel, pipe or other type of means which are used in the art which are capable of maintaining their integrity at elevated temperatures and pressures. The organic material is maintained in reactor means 28 for a sufficient amount of time for the oxidation to proceed to substantial completion, Due to the rapid nature of critical oxidation, a residence time of about 1 minute may be sufficient.

Since the temperature of stream 26 is below its critical temperature, then heat must be added to the system to increase the temperature of the reactor contents to above the critical temperature. The oxidation which commenced in heat exchanger means 24 will continue in reactor means 28 and will generate sufficient energy to raise the temperature of the contents of reactor means 28 above the critical temperature. Preferably, the oxidation in reactor means 28 is allowed to proceed adiabatically so as to raise the temperature of the contents of reactor means 28 to above the critical temperature of the mixture therein. Preferably, the mixture is raised to a temperature from about the critical temperature of the mixture, which may be as low as 320° C., to about 500° C., more preferably from about 374° C. to about 425° C. and, most preferably, to about 400° C. Additional heating or cooling means may be included with reactor means 28 so as to maintain the temperature of the contents of reactor means 28 within these ranges.

Once the temperature of the contents of reactor means 28 exceeds the critical temperature, then the inorganic material will precipitate out and stick to the walls of reactor means 28 if reactor means 28 is not maintained at an elevated pressure sufficient to solubilize the inorganic salts. According to the preferred embodiment, the pressure of liquid/oxidant mixture 26 is already at the elevated pressures described above. In an alternate embodiment, if stream 26 is maintained below its critical temperature in the heat exchanger, then the pressure of stream 26 is increased prior to its entry into reactor means 28. By operating the process according to this invention, the pressure of the liquid/oxidant mixture is maintained at the elevated pressures described herein at least for that portion of the process of which the temperature of the liquid/oxidant stream is above the critical temperature.

Stream 30 exits reactor means 28. Stream 30 contains the oxidized organic material as well as the inorganic material. Once the pressure of stream 30 decreases below the ranges described herein, and if the temperature of the stream is still above the critical temperature, then inorganic material will commence to precipitate out. Accordingly, stream 30 is maintained at an elevated pressure.

According to one embodiment of this invention, stream 30 may be fed to heat exchanger means 24 so as to raise the temperature of stream 22 as described above. Prior to feeding stream 30 through heat exchanger means 24, the inorganic material may be removed from oxidized stream 30 by a controlled depressurization step. Accordingly, stream 30 may be fed to depressurization vessel 32 at which point the pressure is reduced so as allow the inorganic material to precipitate out. Preferably, stream 30 is reduced in depressurization vessel 32 to a pressure sufficiently low to cause the inorganic salts to precipitate out. The pressure may, for example, be reduced below about 7,000 psi. Alternately the pressure may be reduced below about 5,000 psi.

Inorganic material is removed from depressurization vessel 32 via stream 34. The inorganics can be separated by various devices known in the art to separate solid material from fluids such as cyclones, filters and centrifuges. The oxidized material, with the inorganic material removed, may then be fed via stream 36 to heat exchanger means 24. During its passage through heat exchanger means 24, the temperature of the oxidized material decreases. The oxidized material exits heat exchanger means 24 at a decreased temperature via stream 38.

Figure 2:
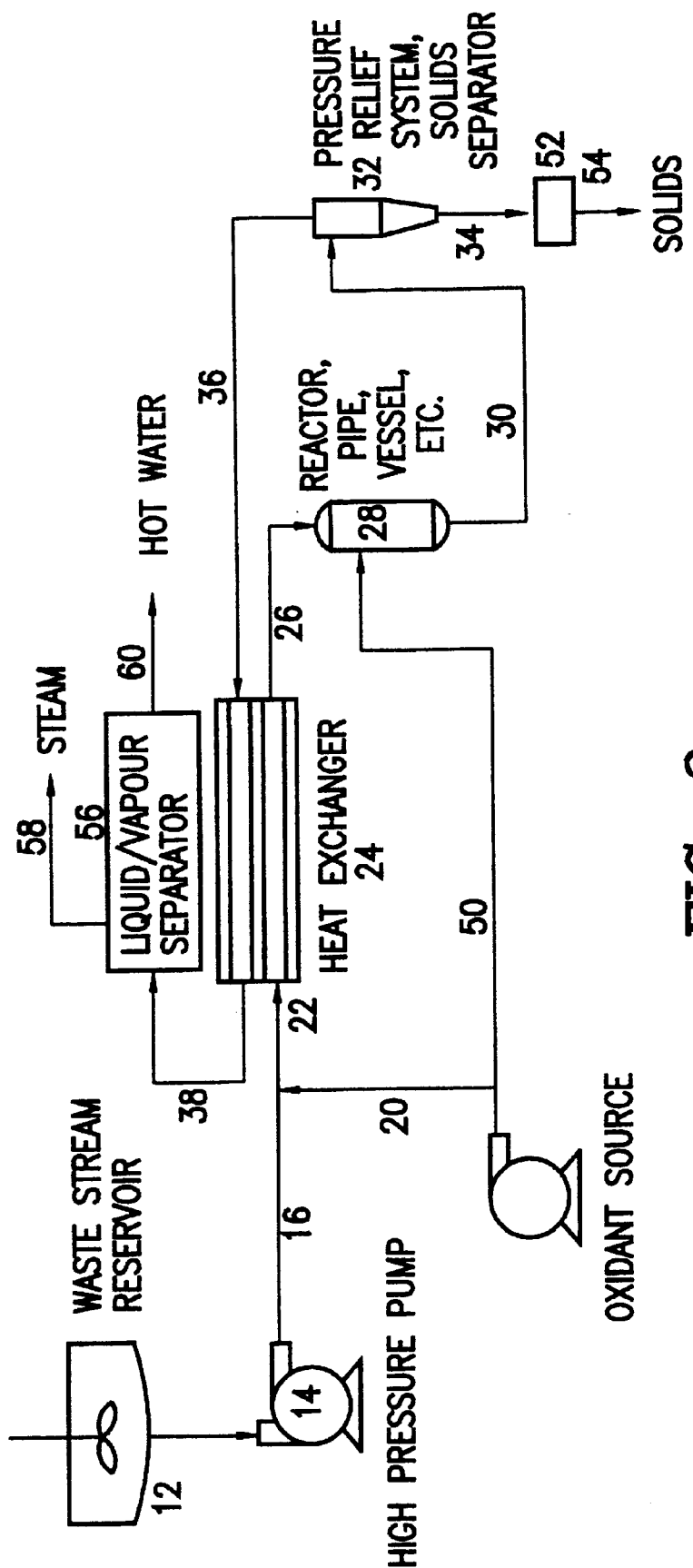
FIG. 2 is schematic of an alternate process according to the instant invention.

In the preferred embodiment shown in FIG. 2, oxidant is added to stream 16 via stream 20 and to reactor means 28 via stream 50. The total amount of oxidant which is added is accordingly divided between streams 20 and 50. In a further alternate emdobiment, all of the oxidant may be added to reactor means 28. This may occur if no preheating step is utilized in the process. As shown in FIG. 2, depressurization vessel 32 comprises a cyclone means. The inorganic salts that precipitate out are transported via stream 34 to collection bin 52. This inorganic material may be sent via process stream 54 for disposal or for further processing.

Stream 38 contains both liquid and vapour phase compounds. Accordingly, stream 38 is fed to liquid/solid separator 56. Liquid/solid separator produces liquid stream 60 which substantially comprises water and vapour stream 58 which substantially comprises steam and carbon dioxide. Additional compounds may be present in either vapour stream 58 or liquid stream 60 depending on the compounds present in waste stream 12 and oxidant streams 16 and/or 50.

We claim:

1. A method for oxidizing organic material in an aqueous stream containing one or more inorganic salts, inorganic salt precursors or mixtures thereof substantially insoluble in the aqueous stream under supercritical conditions near the critical point comprising oxidizing said organic material in the presence of an oxidant in a reactor at a temperature at least equal to the critical temperature of the aqueous stream so as to form a single homogeneous fluid phase and at a pressure sufficiently high to solubilize said inorganic salts in said single homogeneous phase.

2. The method as claimed in claim 1 wherein said temperature is above about 320° C.

3. The method as claimed in claim 2 wherein said pressure is from about 4,500 psi to about 25,000 psi.

4. A method as claimed in claim 3 wherein said oxidant is selected from the group consisting of air, gaseous oxygen, liquid oxygen or mixtures thereof.

5. The method as claimed in claim 1 wherein said pressure sufficiently high to solubilize said inorganic salts, inorganic salt precursors or mixtures thereof in said single homogeneous fluid phase is from about 7,000 to about 13,000 psi.

6. The method of claim 5 wherein said pressure is from about 8,000 to about 13,000 psi.

7. The method of claim 6 wherein said pressure is from about 9,000 to about 10,000 psi.

8. The method as claimed in claim 1 wherein said pressure sufficiently high to solubilize said inorganic salts, inorganic salt precursors or mixtures thereof in said single homogeneous fluid phase is from about 4,500 to about 25,000 psi.

9. A method for critically oxidizing organic material in an aqueous stream containing one or one or more inorganic salts, inorganic salt precursors or mixtures thereof substantially insoluble in the aqueous stream under supercritical conditions near the critical point comprising:

(a) raising said aqueous stream to a pressure sufficiently high to solubilize said inorganic salts once said stream is raised to a temperature at least equal to the critical temperature of the aqueous stream so as to form a single homogeneous fluid phase;

(b) introducing an oxidant to said aqueous stream to form a mixed stream of oxidant and said aqueous stream; and, (c) raising the temperature of said aqueous stream to a temperature at least equal to the critical temperature of the aqueous stream to form a single homogeneous fluid phase in which the oxidation of the organic material occurs whereby a stream of oxidized organic material is formed.

10. The method as claimed in claim 9 wherein said temperature is above about 320° C.

11. The method as claimed in claim 10 wherein said pressure is from about 4,500 psi to about 25,000 psi.

12. The method as claimed in claim 11 wherein said mixed stream is raised to an elevated temperature sufficiently high, but below said critical temperature, for the oxidation of said organic material to commence.

13. The method as claimed in claim 12 wherein mixed stream is raised to said elevated temperature by passing said mixed stream and said stream of oxidized organic material through a heat exchanger.

14. The method as claimed in claim 13 wherein, prior to introducing said stream of oxidized organic material into said heat exchanger, the pressure of said stream of oxidized organic material is reduced to a value to permit said inorganic salts to precipitate out and said precipitated inorganic salts are separated from said stream of depressurized oxidized organic material.

15. The method as claimed in claim 14 wherein said oxidized organic material is depressurized to a pressure below about 7,000 psi.

16. The method as claimed in claim 15 wherein said oxidized organic material is depressurized to a pressure below about 5000 psi.

17. The method as claimed in claim 12 wherein said aqueous stream in step (c) is raised to a temperature from about 320° C. to about 500° C.

18. The method as claimed in claim 17 wherein said elevated temperature is about 300° C.

19. The method as claimed in claim 12 wherein said oxidation is allowed to proceed adiabatically to raise the temperature of said mixed stream to at least said critical temperature.

20. The method as claimed in claim 11 further comprising the steps of depressurizing said stream of oxidized organic material to permit said inorganic salts to precipitate out and separating said precipitate inorganic salts from said stream of depressurized oxidized organic material.

21. The method as claimed in claim 20 wherein said oxidized organic material is depressurized to a pressure below about 7,000 psi.

22. The method as claimed in claim 21 wherein said oxidized organic material is depressurized to a pressure below about 5000 psi.

23. The method as claimed in claim 11 wherein said oxidant selected from the group consisting of air, gaseous oxygen, liquid oxygen and mixtures thereof.

24. The method as claimed in claim 9 wherein said pressure sufficiently high to solubilize said inorganic salts, inorganic salt precursors or mixtures thereof in said single homogeneous fluid phase is from about 7,000 to about 13,000 psi.

25. The method of claim 24 wherein said pressure is from about 8,000 to about 13,000 psi.

26. The method of claim 25 wherein said pressure is from about 9,000 to about 10,000 psi.

27. The method as claimed is claim 9 wherein said pressure sufficiently high to solubilize said inorganic salts, inorganic salt precursors or mixtures thereof in said single homogeneous fluid phase is from about 4.500 to about 25,000 psi.

* * * * *